(12) United States Patent
Jin et al.

(10) Patent No.: US 10,454,090 B2
(45) Date of Patent: Oct. 22, 2019

(54) ELECTRODE TAB COATED WITH ELECTRICAL INSULATING LAYER AND SECONDARY BATTERY COMPRISING THE SAME

(71) Applicant: LG Chem, Ltd., Seoul (KR)

(72) Inventors: Sun-Mi Jin, Daejeon (KR); In-Gyoung Yu, Daejeon (KR); Joo-Sung Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/108,938

(22) PCT Filed: Oct. 16, 2015

(86) PCT No.: PCT/KR2015/010984
§ 371 (c)(1),
(2) Date: Jun. 29, 2016

(87) PCT Pub. No.: WO2016/060521
PCT Pub. Date: Apr. 21, 2016

(65) Prior Publication Data
US 2016/0329547 A1 Nov. 10, 2016

(30) Foreign Application Priority Data
Oct. 16, 2014 (KR) .................. 10-2014-0140058

(51) Int. Cl.
*H01M 2/26* (2006.01)
*H01M 10/058* (2010.01)
(Continued)

(52) U.S. Cl.
CPC ............... *H01M 2/26* (2013.01); *H01M 2/30* (2013.01); *H01M 2/347* (2013.01);
(Continued)

(58) Field of Classification Search
None
See application file for complete search history.

(56) References Cited

U.S. PATENT DOCUMENTS

| | | |
|---|---|---|
| 6,335,114 B1 | 1/2002 | Ueshima et al. |
| 2012/0003525 A1* | 1/2012 | Hashimoto ............ H01G 9/02 429/144 |

(Continued)

FOREIGN PATENT DOCUMENTS

| | | |
|---|---|---|
| CN | 101931074 A | 12/2010 |
| EP | 2437330 A1 | 4/2012 |

(Continued)

OTHER PUBLICATIONS

International Search Report for Application No. PCT/KR2015/010984 dated Feb. 11, 2016.

(Continued)

*Primary Examiner* — Christopher P Domone
(74) *Attorney, Agent, or Firm* — Lerner, David, Littenberg, Krumholz & Mentlik, LLP (57) ABSTRACT

An electrode tab coated with an electrical insulating layer according to one aspect of the present disclosure, and a secondary battery comprising the same can provide further enhanced electrical insulating effect.

12 Claims, 3 Drawing Sheets

(51) Int. Cl.
  *H01M 2/30* (2006.01)
  *H01M 10/0525* (2010.01)
  *H01M 2/34* (2006.01)
  *H01M 2/02* (2006.01)
  *H01M 10/052* (2010.01)

(52) U.S. Cl.
  CPC ..... *H01M 10/058* (2013.01); *H01M 10/0525* (2013.01); *H01M 2/0207* (2013.01); *H01M 2/0217* (2013.01); *H01M 10/052* (2013.01); *H01M 2200/00* (2013.01); *H01M 2220/30* (2013.01)

(56) References Cited

U.S. PATENT DOCUMENTS

| | | | |
|---|---|---|---|
| 2012/0082891 A1* | 4/2012 | Ahn | H01M 2/1673 429/211 |
| 2012/0244423 A1 | 9/2012 | Kusukawa et al. | |
| 2013/0048340 A1* | 2/2013 | Bando | H01G 11/22 174/126.2 |
| 2013/0224580 A1 | 8/2013 | Cherng et al. | |
| 2013/0309566 A1 | 11/2013 | Umehara | |

FOREIGN PATENT DOCUMENTS

| | | |
|---|---|---|
| EP | 2802029 A1 | 11/2014 |
| JP | H11111300 A | 4/1999 |
| JP | 2004158434 A | 6/2004 |
| JP | 2009181899 A | 8/2009 |
| JP | 2010267466 A | 11/2010 |
| JP | 2011216403 A | 10/2011 |
| JP | 2011243351 A | 12/2011 |
| JP | 2013089528 A | 5/2013 |
| JP | 2013109866 A | 6/2013 |
| JP | 2014032758 A | 2/2014 |
| KR | 20140009037 A | 1/2014 |
| KR | 20140112609 A | 9/2014 |

OTHER PUBLICATIONS

Extended European Search Report for Application No. EP158509752.9 dated Jul. 19, 2017.

* cited by examiner

ELECTRODE TAB COATED WITH ELECTRICAL INSULATING LAYER AND SECONDARY BATTERY COMPRISING THE SAME

CROSS-REFERENCE TO RELATED APPLICATION

This application is a national phase entry under 35 U.S.C. § 371 of International Application No. PCT/KR2015/010984, filed Oct. 16, 2015, which claims priority to Korean Patent Application No. 10-2014-0140058, filed Oct. 16, 2014, the disclosures of which are incorporated herein by reference.

TECHNICAL FIELD

The present disclosure relates to an electrode tab coated with an electrical insulating layer and a secondary battery comprising the same, and more particularly, to an electrode tab coated with an electrical insulating layer comprising an inorganic filler, an aqueous binder, and a slurry stabilizer, and a secondary battery comprising the same.

BACKGROUND ART

The technical advancement and increasing demands for mobile devices have led into rapidly increasing demand for the secondary batteries for use as the energy source, and accordingly, numerous studies are under way about batteries that can meet a variety of demands.

For representative example, in terms of the shape of batteries, prismatic batteries or pouch-shaped batteries, which are thin enough to be applied to products such as mobile phones, are in mat demand. In terms of the material for batteries, demand is high for the lithium secondary batteries such as lithium cobalt polymer batteries that exhibit high energy density, discharge voltage and output stability.

One of the main objectives of these researches for such secondary batteries is the safety enhancement. Generally, the lithium secondary battery has a risk of battery explosion due to high temperature and high pressure therein which can be caused by abnormal operating states such as internal short circuit, over-charging state exceeding allowable current and voltage, exposure to high temperature, impact from falling, and so on. One example of such cases is the possibility that the secondary battery is subject to internal short circuit in the event of impact such as falling or application of external force, and so on.

Figure 1:
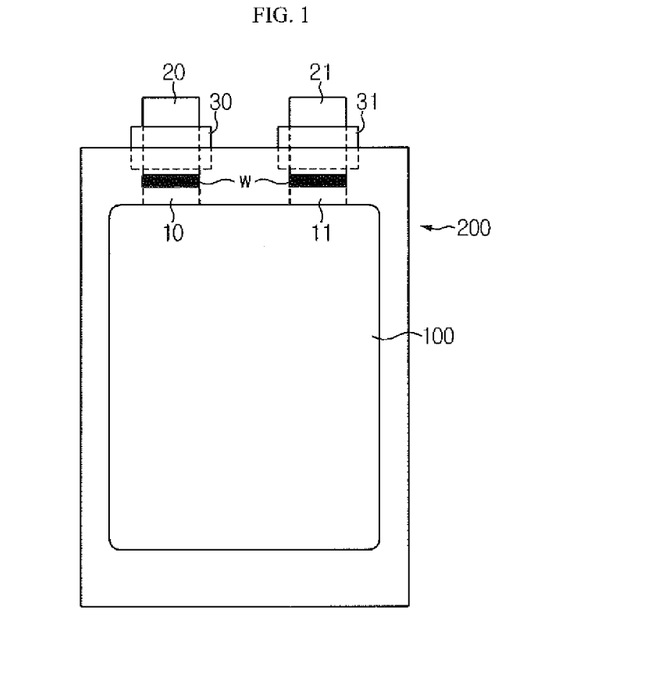
FIG. 1 is a cross sectional view of a related pouch-shaped secondary battery.

FIG. 1 schematically illustrates a general structure of a pouch-shaped secondary battery.

Referring to FIG. 1, a secondary battery 10 includes an electrode assembly 100, a battery case 200, electrode tabs 10, 11, and electrode leads 20, 21.

The electrode assembly 100 includes a positive electrode plate, a negative electrode plate, and a separator. In the electrode assembly 100, the positive electrode plate and the negative electrode plate interposed by the separator may be sequentially stacked on one another. Representative examples of the electrode assembly 100 may include a jelly-roll (wound type) electrode assembly having a structure in which elongated sheet types of positive electrodes and negative electrodes interposed by the separators are wound, a stack type electrode assembly in which a plurality of positive electrodes and negative electrodes each being cut into a predetermined size unit and interposed by the separators are sequentially stacked, a stack/folding type electrode assembly having a structure in which bi-cells or full cells, having stacks of a predetermined units of positive electrodes and negative electrodes interposed by the separators, are wound, and so on.

The battery case 200 may have a size to accommodate the electrode assembly 100, and the electrode tabs 10, 11 and the electrode leads 20, 21 which will be described below.

The electrode tabs 10, 11 extend from the electrode assembly 100. For example, the positive electrode tab 10 extends from the positive electrode plate, and the negative electrode tab 11 extends from the negative electrode plate. In this case, when the electrode assembly 100 is configured as a stack of a plurality of positive electrode plates and a plurality of negative electrode plates, the electrode tabs 10, 11 extend from each of the positive electrode plates and negative electrode plates. In this case, the electrode tabs 10, 11 may not be directly exposed to outside the battery case 200, but exposed to outside in a manner of being connected to another constituent element such as electrode leads 20, 21, and so on.

A portion of each of the electrode leads 20, 21 may be electrically connected with the electrode tabs 10, 11 each extending from the positive electrode plate or the negative electrode plate. In this case, the electrode leads 20, 21 may be bonded to the electrode tabs 10, 11 by welding, and so on, which is indicated by the darkened area W in FIG. 1. For example, the method of bonding the electrode leads 20, 21 with the electrode tabs 10, 11 may include general resistance welding, ultrasonic welding, laser welding, riveting, and so on. Further, the electrode leads 20, 21 may additionally include sealing tapes 30, 31 at portions connected to the exposure portions.

In one aspect of a pouch-shaped secondary battery configuration that uses a plurality of positive electrodes and negative electrodes, the positive electrode tabs and negative electrode tabs each extending therefrom are bonded in a generally known manner to be coupled with the electrode leads.

In order to ensure space for bonding portions of the electrode tabs and electrode leads, the electrode assembly is at a predetermined distance apart from the upper part of the battery case.

Meanwhile, when the battery falls or when physical external force is applied on the upper part of the battery, thereby causing the electrode tabs to contact the upper end of the electrode assembly, short circuit is caused at the battery. Generally, the short circuit is caused in many cases due to the contact of the positive electrode tabs with the negative electrode current collector or the negative electrode active material.

Technical constitution wherein insulating member is onto the electrode tab has been suggested in order to solve the problems mentioned above, however, the internal short circuit of the battery is not still prevented completely and problems such as weakened adhesion strength of the insulating member and subsequent detaching thereof exist. Accordingly, improvements are necessary.

DISCLOSURE

Technical Problem

The present disclosure is designed to solve the problems of the related art, and therefore the present disclosure is directed to providing an electrode tab having an electrical insulating layer, which has enhanced electrical insulating property.

Further, the present disclosure is designed to solve the problem of deteriorated electrical insulating effect due to earlier sedimentation of inorganic filler used for an electrical insulating layer than a desired time point.

Technical Solution

In one aspect of the present disclosure, there is provided an electrode tab coated with an electrical insulating layer comprising an inorganic filler, an aqueous binder, and a slurry stabilizer.

The electrode tab extends from an electrode current collector, and the electrical insulating layer may be formed on the electrode tab with a thickness less than that of an active material layer formed on the electrode current collector.

The electrical insulating layer may have a thickness in a range of 5% to 100% of the active material layer.

The electrical insulating layer may have a thickness in a range of 10% to 50% of the active material layer.

The electrical insulating layer may be formed on an entirety of the electrode tab. The electrical insulating layer may be formed at areas of the electrode tab except a connecting portion with the electrode lead.

The electrical insulating layer may be formed on a portion of the electrode tab.

The inorganic filler may be one or at least two selected from the group consisting of $SiO_2$, $TiO_2$, $Al_2O_3$, AlOOH, γ-AlOOH, $ZrO_2$, $SnO_2$, $CeO_2$, MgO, CaO, ZnO, $Y_2O_3$, $Pb(Zr,Ti)O_3$ (PZT), $Pb_{1-x}La_xZr_{1-y}Ti_yO_3$ (PLZT), PB $(Mg_{1/3}Nb_{2/3})O_3$—$PbTiO_3$ (PMN—PT), $BaTiO_3$, hafnia ($HfO_2$) and $SrTiO_3$.

The aqueous binder may be one or at least two selected from the group consisting of styrene-butadiene rubber, acrylated styrene-butadiene rubber, acrylonitrile-butadiene rubber, acrylonitrile-butadiene-styrene rubber, acrylic rubber, butyl rubber, fluoro rubber, polytetrafluoroethylene, polyethylene, polypropylene, ethylenepropylene copolymer, polyethylene oxide, polyvinylpyrrolidone, polyepichlorohydrin, polyphosphazenes, polyacrylonitrile, polystyrene, ethylene propylene diene copolymer, polyvinylpyrridine, chlorosulfonated polyethylene, latex, polyester resin, acrylic resin, phenolic resin, epoxy resin, polyvinyl alcohol, hydroxypropyl methylcellulose, hydroxypropyl cellulose and diacetyl cellulose.

The slurry stabilizer may be carboxymethyl cellulose, carboxyethyl cellulose, or derivatives thereof.

The inorganic filler and the aqueous binder may be used at a weight ratio of 5:95 to 80:20 or 10:90 to 50:50.

The slurry stabilizer may be used in an amount of 0.1 wt % to 5 wt % with respect to the inorganic filler.

The electrode tab may be a positive electrode tab.

In another aspect of the present disclosure, there is also provided a secondary battery comprising the electrode tab described above.

The secondary battery may be a lithium secondary battery.

The secondary battery may be a prismatic secondary battery or a pouch-shaped secondary battery.

Advantageous Effects

The present disclosure gives the following effects. In the slurry for the formation of an electrical insulating layer of an electrode tab, the inorganic filler can be kept in the dispersed state for a long period of time without forming sedimentation. Accordingly, slurry stability is ensured, and convenience can be provided in the preparation process using the slurry.

Further, in the electrode tab according to one aspect of the present disclosure, the electrical insulating layer is formed with a uniform distribution of inorganic filler, and therefore, further enhanced electrical insulating effect can be obtained.

DESCRIPTION OF DRAWINGS

Other objects and aspects of the present disclosure will become apparent from the following descriptions of the embodiments with reference to the accompanying drawings in which.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

According to one aspect of the present disclosure, a secondary battery wherein a coating layer having superior electrical insulating property, i.e., with an electrical insulating layer is formed on electrode tabs, is provided. According to the present disclosure, in order to prevent short circuit due to contact between electrode tab and the current collector or the active material of the electrode assembly from being occurred, a slurry for the formation of the electrical insulating layer is preferably coated on the positive electrode tab or on both the positive electrode tab and the negative electrode tab. Thereby, even when the electrode tab is in contact with the electrode assembly, good electrically-insulated state can be maintained owing to the electrical insulating layer and thus short circuit can be prevented.

According to one aspect of the present disclosure, the slurry for the formation of the electrical insulating layer may comprise an inorganic filler, an aqueous binder, and a slurry stabilizer to enhance slurry stability, and may additionally include an additive as generally used in the art.

According to the present disclosure, the inorganic filler is not specifically limited as long as it can be coated on the electrode tab and contribute to the effect of enhanced electrical insulation, and in a non-limiting example, the inorganic filler may be one or at least two selected from the group consisting of $SiO_2$, $TiO_2$, $Al_2O_3$, AlOOH, γ-AlOOH, $ZrO_2$, $SnO_2$, $CeO_2$, MgO, CaO, ZnO, $Y_2O_3$, $Pb(Zr,Ti)O_3$ (PZT), $Pb_{1-x}La_xZr_{1-y}Ti_yO_3$ (PLZT), $PB(Mg_{1/3}Nb_{2/3})O_3$—$PbTiO_3$(PMN—PT), $BaTiO_3$, hafnia ($HfO_2$) and $SrTiO_3$.

According to the present disclosure, the aqueous binder is a component used for the adhesion between the inorganic fillers or between the inorganic filler and the electrode tab, and in a non-limiting example, the aqueous binder may include one or at least two selected from the group consisting of styrene-butadiene rubber, acrylated styrene-butadiene rubber, acrylonitrile-butadiene rubber, acrylonitrile-butadiene-styrene rubber, acrylic rubber, butyl rubber, fluoro rubber, polytetrafluoroethylene, polyethylene, polypropylene, ethylene propylene copolymer, polyethylene oxide, polyvinylpyrrolidone, polyepichlorohydrine, polyphosphazenes, polyacrylonitrile, polystyrene, ethylene propylene diene copolymer, polyvinyl pyrridine, chlorosulfonated polyethylene, latex, polyester resin, acrylic resin, phenolic resin, epoxy resin, polyvinyl alcohol, hydroxypropyl methylcellulose, hydroxypropylcellulose and diacetyl cellulose, but not limited thereto. When the copolymer includes styrene, styrene may be selected from one or at least two selected from the group consisting of styrene, α-styrene, α-methylstyrene, β-methylstyrene and p-t-butylstyrene for copolymerization, but not limited thereto.

The inorganic filler and the aqueous binder may be used at a weight ratio of 5:95 to 80:20 or 10:90 to 50:50. When the inorganic filler is used more than the upper limit, adhesivity between the inorganic fillers and adhesivity between the electrical insulating layer and the electrode tab may deteriorate, while when the inorganic filler is used less than the lower limit, it is difficult to obtain desired electrical insulating effect.

The slurry stabilizer according to the present disclosure refers to a component that is included in the slurry for forming the electrical insulating layer and adsorbed to the inorganic filler to enhance slurry stability, and the term 'slurry stability' as used herein is understood as meaning a property of the slurry such that once the slurry is coated, the inorganic filler included in the slurry is uniformly dispersed and distributed across the entire slurry for a long period of time without sedimentation. The 'long period of time' as used herein may refer to a period until the slurry is dried, for example.

For such slurry stabilizer, the cellulose compound may be exemplified, such as, in a non-limiting example, carboxymethyl cellulose, carboxyethyl cellulose, or derivative such as, for example, cation-substituted compound such as ammonium ion or monovalent metal ion.

The slurry stabilizer may be used in an amount of 0.1 wt % to 5 wt % with respect to the inorganic filler. When the slurry stabilizer is used more than the upper limit, viscosity increases to deteriorate coating properties, while, when the slurry stabilizer is used less than the lower limit, the inorganic filler settles earlier than a desired time point, thus failing to achieve slurry stability.

A solvent or a dispersion medium used in the slurry for the formation of the electrical insulating layer may include water; alcohols such as methanol, ethanol, propanol, butanol, and so on; ketones such as acetone, phenyl ethyl ketone; ethers such as methylethyl ether, diethyl ether, diisoamyl ether, and so on; lactones such as gamma-butyrolactone, and so on; lactams such as beta-lactame, and so on; cyclic aliphatic compounds such as cyclopentane, cyclohexane, and so on; aromatic hydrocarbons such as benzene, toluene, and so on; esters such as methyl lactate, ethyl lactate, and so on. Specifically, water may be used as an environmentally-friendly dispersion medium.

The content of the solvent is not specifically limited, but may be determined in consideration of the dispersibility of the inorganic filler, ease of coating, dry time, and so on.

A method for forming the coating layer may involve dipping, deep coating, spray coating, spin coating, roll coating, die coating, roll coat, gravure printing, bar coat, and so on, but not limited thereto.

The electrical insulating layer, which is obtained by coating the slurry for the formation of the electrical insulating layer on the electrode tab and drying the same, may preferably be formed thinner than a positive electrode active material layer. For example, a thickness of the electrical insulating layer may be determined in a range of approximately 5% to 100% or 10% to 50% of a thickness of the active material layer. When the electrical insulating layer is formed thinner than the lower limit, the electrical insulating effect can hardly be anticipated, while, when the electrical insulating layer is formed thicker than the upper limit, the volume of the electrode tab increases unnecessarily, which is not desirable.

Figure 2:
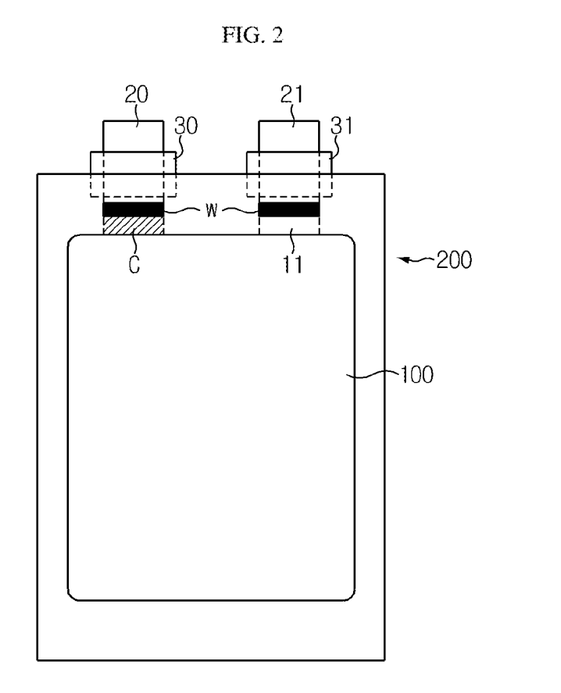
FIG. 2 is a cross sectional view of a pouch-shaped secondary battery according to the present disclosure.

FIG. 2 schematically shows a pouch-shaped secondary battery according to one aspect of the present disclosure, in which the electrical insulating layer C is formed on the positive electrode tab.

When the secondary battery falls and subjects to the external shock, there is a high possibility that the positive electrode tab would first contact the negative electrode (its current collector or active material). Considering this, the slurry for the formation of the electrical insulating layer of the present disclosure may preferably be coated on the positive electrode tab, or alternatively, the electrical insulating layer may be formed on both the positive electrode tab and the negative electrode tab.

Further, while FIG. 2 illustrates only one positive electrode tab, the electrical insulating layer may be formed on each of a plurality of positive electrode tabs and negative electrode tabs, when the secondary battery uses a plurality of positive electrodes and negative electrodes and thus includes a plurality of positive electrode tabs and negative electrode tabs.

Further, the electrical insulating layer according to the present disclosure may be formed on a portion or an entirety of the electrode tab.

A non-limiting example of the electrical insulating layer being formed on a portion of the electrode tab may involve one aspect in which the electrical insulating layer is formed on the electrode tab that is adjacent to the electrode assembly and is most likely to contact the electrode assembly. Alternatively, another aspect may be contemplated in which the electrical insulating layer may be formed at areas of the electrode tab except a connecting portion with the electrode lead.

The electrical insulating layer may be formed on the entirety of the electrode tab. Since the electrical insulating layer is ablated during welding for connecting to the electrode lead, the embodiment wherein the electrical insulating layer is formed on the entirety of the electrode tab is possible. In view of convenience of processing, the electrical insulating layer is preferably formed on the entirety of the electrode tab.

According to the present disclosure, the electrode assembly in which the positive electrode and the negative electrode interposed by the separator are sequentially stacked, may be stacked into a stack type or stack-folding type in order to configure a secondary battery, or wound into a jelly-roll type in order to configure a secondary battery.

The battery case may take a variety of forms including a pouch-shaped case or prismatic case, for example.

For example, the positive electrode may be prepared by applying a mixture comprising a positive electrode active material, a conducting agent, and a binder on the positive electrode current collector and drying the same, and, if necessary, a filler may be added to the mixture.

Examples of the positive electrode active material may include, but are not limited thereto, layered compounds such as lithium cobalt oxide ($LiCoO_2$), lithium nickel oxide ($LiNiO_2$), and so on, or compounds thereof substituted with one or more transition metals; lithium manganese oxide of Formula $Li_{1+x}Mn_{2-x}O_4$ (where, x is 0 to 0.33), such as $LiMnO_3$, $LiMn_2O_3$, $LiMnO_2$, and so on; lithium copper oxide ($Li_2CuO_2$); vanadium oxide such as $LiV_3O_8$, $LiFe_3O_4$, $V_2O_5$, $Cu_2V_2O_7$, and so on; Ni-site type lithium nickel oxide expressed by Formula $LiNi_{1-x}M_xO_2$ (where, M=Co, Mn, Al, Cu, Fe, Mg, B or Ga, x=0.01 to 0.3); lithium manganese composite oxide expressed by Formula $LiMn_{2-x}M_xO_2$ (where, M=Co, Ni, Fe, Cr, Zn or Ta, x=0.01 to 0.1) or expressed by $Li_2Mn_3MO_8$ (where, M=Fe, Co, Ni, Cu or Zn); $LiMn_2O_4$ wherein a portion of Li is substituted with alkaline earth metal ions; disulfide compounds; and $Fe_2(MoO_4)_3$.

The positive electrode current collector is typically fabricated to have a thickness of 3 μm to 500 μm. The positive electrode current collector is not limited to any specific kind as long as it has high conductivity and does not cause chemical changes in the corresponding battery. For example, stainless steel, aluminum, nickel, titanium, sintered carbon, or aluminum or stainless steel whose surface is treated with carbon, nickel, titanium, silver, and so on, may be used. The positive electrode current collector may have micro irregularities on the surface thereof so as to enhance adhesion strength to the positive electrode active material, and may take a variety of forms including films, sheets, foils, nets, porous structures, foams, non-woven fabric, and so on.

The conducting agent may be generally added in an amount of 1 wt % to 50 wt %, based on the total weight of the mixture including the positive electrode active material. The conducting agent is not limited to any specific kind as long as it has a conductivity and does not cause chemical changes in the corresponding battery. Examples of the conducting agent that may be used include graphite such as natural or artificial graphite; carbon blacks such as carbon black, acetylene black, Ketjen black, channel black, furnace black, lamp black, thermal black, and so on; conductive fibers such as carbon fibers, metallic fibers, and so on; metallic powders such as carbon fluoride powder, aluminum powder, nickel powder, and so on; conductive whiskers such as zinc oxide, potassium titanate, and so on; conductive metal oxide such as titanium oxide, and so on; polyphenylene derivatives, and so on.

The binder is a component that helps binding of the active material, the conducting agent, and so on, and binding to the current collector, and is generally added in an amount of 1 wt % to 30 wt %, based on the total weight of the mixture including the positive electrode active material. Example of the binder may include polyfluorinated vinylidene, polyvinyl alcohol, carboxymethyl cellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubber, fluoro rubber, various copolymers, and so on.

The filler is a component that inhibits expansion of the positive electrode. The filler is selectively used, and not limited to any specific kind as long as it does not cause chemical changes in the corresponding battery and is a fibrous material. Examples of the filler that may be used include olefin polymers such as polyethylene, polypropylene, and so on; and fibrous materials such as Mass fibers, carbon fibers, and so on.

The negative electrode is fabricated by applying a negative electrode material on the negative electrode current collector and drying the same, and depending on needs, the components described above may be added.

The negative electrode current collector is typically fabricated to have a thickness of 3 μm to 500 μm. The negative electrode current collector is not limited to any specific kind as long as it has conductivity and does not cause chemical changes in the corresponding battery. For example, copper, stainless steel, aluminum, nickel, titanium, sintered carbon, or, copper or stainless steel whose surface is treated with carbon, nickel, titanium, silver, and so on, aluminum-cadmium alloy, and so on, may be used. Further, like the positive electrode current collector, the negative electrode current collector may have micro irregularities on the surface thereof so as to enhance adhesivity to the negative electrode active material, and may take a variety of forms including films, sheets, foils, nets, porous structures, foams, non-woven fabric, and so on.

Examples of the negative electrode material that may be used may include: carbon such as non-graphitizing carbon, graphite carbon, and so on; a metal composite oxide such as $Li_xFe_2O_3 (0 \leq x \leq 1)$, $Li_xWO_2 (0 \leq x \leq 1)$, $S_xMe_{1-x}Me'_yO_z$ (Me: Mn, Fe, Pb, Ge; Me': Al, B, P, Si, Group I, II, III elements in periodic table, halogen, $0 < x \leq 1$; $1 \leq y \leq 3$; $1 \leq z \leq 8$); lithium metal; lithium alloys; silicon alloys; tin alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, and so on; conductive polymers such as polyacethylene, and so on; Li—Co—Ni materials, and so on.

The separator is interposed between the positive electrode and the negative electrode and may be formed using a thin insulation film having a high ion permeability and excellent mechanical strength. The separator typically has a pore diameter of 0.01 μm to 10 μm, and a thickness of 5 μm to 300 μm. For such separator, a sheet or a non-woven fabric made of olefin polymer such as polypropylene, and so on; glass fiber or polyethylene, which have chemical resistance and hydrophobicity, are used. When the solid electrolyte such as polymer, and so on is used for the electrolyte, the solid electrolyte may also serve as the separator.

The non-aqueous electrolyte containing lithium salt is composed of non-aqueous electrolyte and lithium. For the non-aqueous electrolyte, non-aqueous electrolyte solution, solid electrolyte, inorganic solid electrolyte, and so on, is used.

For the non-aqueous electrolyte solution, an aprotic organic solvent may be used, which may include, for example, N-methyl-2-pyrrolidinone, propylene carbonate, ethylene carbonate, butylene carbonate, dimethy carbonate, diethyl carbonate, gamma-butyrolactone, 1,2-dimethoxyethane, 2-methyl tetrahydrofuran, dimethyl sulfoxide, 1,3-dioxolane, formamide, dimethyl formamide, dioxolane, acetonitrile, nitromethane, methyl formate, methyl acetate, phosphoric triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and so on.

Examples of the organic solid electrolyte may include, for example, polyethylene derivatives, polyethylene oxide derivatives, polypropylene oxide derivatives, phosphoric ester polymers, poly agitation lysine, polyester sulfide, polyvinyl alcohol, polyvinylidene fluoride, polymers having ionic dissociation groups, and so on.

Examples of the inorganic solid electrolyte may include, for example, nitrides, halides, sulfates, and so on, of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$.

The lithium salt described above is a material readily dissolved in the non-aqueous electrolyte and examples thereof that may be used may include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, low aliphatic carboxylic lithium, lithium 4-phenyl borate, imides, and so on.

Additionally, in order to improve charge-discharge properties and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethyleneglycol dialkyl ether, ammonium salts, pyrrole, 2-methoxy ethanol, aluminum trichloride, and so on, may be added to the non-aqueous electrolyte. Depending on needs, in order to impart non-flammability, the non-aqueous electrolyte may further include halogen-containing solvents such as carbon tetrachloride, ethylene trifluoride, and so on, and in order to improve high-temperature storage characteristics, the non-aqueous electrolyte may further include carbon dioxide gas.

MODE FOR DISCLOSURE

The present disclosure will be explained in detail as follows.

Example 1

The slurry stabilizer (carboxymethyl cellulose, Daicel, 2200) was dissolved with water as a solvent, and then alumina (Nippon Light Metal Company, Ltd., LS235) was added such that a ratio of slurry stabilizer to the inorganic particles became 0.5 wt %. The binder (Zeon, BM-L301) was added to the dispersed alumina slurry such that the weight ratio between alumina and binder became 2:8. Accordingly, final slurry was prepared. The final 40% solid slurry exhibited a viscosity of 12 cP at a shear rate of 10/sec, and maintained dispersibility even after being left for 12 hours.

The dispersed slurry was coated to a thickness of 30% of the positive electrode active material and to a width of 1.7 mm. Accordingly, the positive electrode processed with insulating layer was completed. The lithium secondary battery was completed by incorporating the positive electrode processed with the insulating layer.

Comparative Example 1

The slurry was prepared in the same manner as Example 1 except that the slurry stabilizer was not used. The slurry exhibited a viscosity of 10 cP at the shear rate of 10/sec, but after having been left for 12 hours, the slurry settled. Accordingly, it was not possible to ensure the coating processability.

Comparative Example 2

The slurry was prepared in the same manner as Example 1 except that the mixing ratio of the alumina and binder was adjusted to 9:1. The slurry exhibited a viscosity of 92 cP at the shear rate of 10/sec, and accordingly, it was difficult to ensure coating processability.

Comparative Example 3

The same positive electrode as in Example 1 was prepared in a state that the electrical insulating layer coating was not performed. The lithium secondary battery was completed by incorporating the positive electrode.

Evaluation Example

The lithium secondary batteries prepared in Example 1 and Comparative Example 3 underwent hot box test in which the batteries were left at 150° C. for 1 hour.

Figure 3:
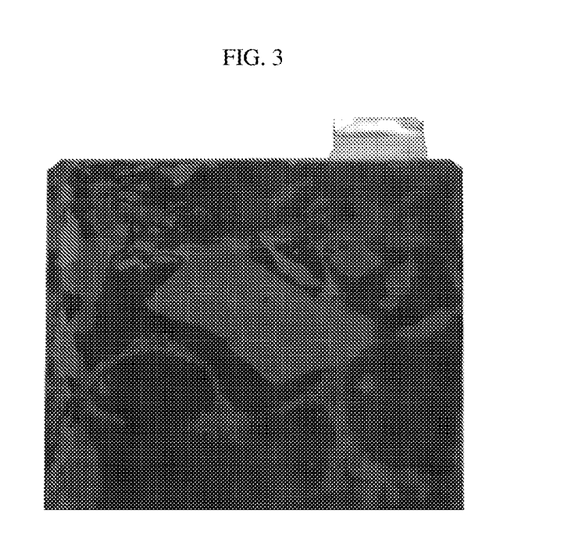
FIG. 3 is a photograph of a disassembled lithium secondary battery prepared by Example 1 after hot box test.

The lithium secondary battery in Example 1 satisfied the safety requirement, without having a voltage drop during hot box test. FIG. 3 shows a photograph of the disassembled battery after the test. Referring to FIG. 3, the separator was shrunk, but it was possible to confirm that the insulating coating layer was maintained even after the safety test.

Figure 4:
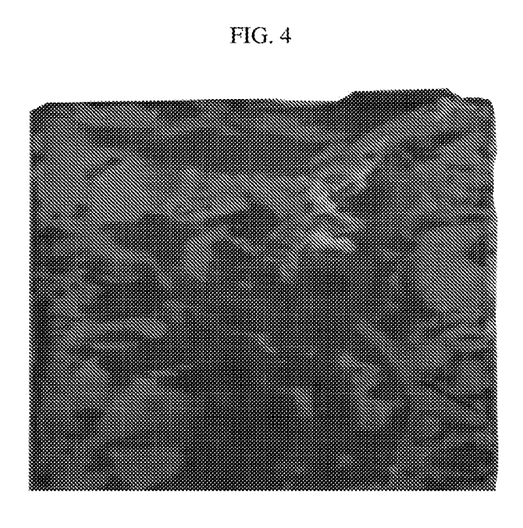
FIG. 4 is a photograph of a disassembled lithium secondary battery prepared by Comparative Example 3 after hot box test.

A significant voltage drop was observed in the lithium secondary battery in Comparative Example 3 during hot box test. FIG. 4 shows a photograph of the disassembled battery after the test, in which it was confirmed that the separator was shrunk, according to which short circuit was occurred between the positive electrode and the negative electrode.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An electrode tab coated with an electrical insulating layer comprising an inorganic filler, an aqueous binder, and a slurry stabilizer, wherein the electrode tab extends from an electrode current collector, and an electrode lead connected to a connecting portion at the distal end of the electrode tab, and wherein the electrical insulating layer is formed on the entire electrode tab, except for the connecting portion, with a thickness less than that of an active material layer formed on the electrode current collector.

2. The electrode tab of claim 1, wherein the electrical insulating layer has a thickness in a range of 5% to 100% of the active material layer.

3. The electrode tab of claim 1, wherein the electrical insulating layer has a thickness in a range of 10% to 50% of the active material layer.

4. The electrode tab of claim 1, wherein the inorganic filler is one or at least two selected from the group consisting of $SiO_2$, $TiO_2$, $Al_2O_3$, $AlOOH$, $\gamma$-$AlOOH$, $ZrO_2$, $SnO_2$, $CeO_2$, $MgO$, $CaO$, $ZnO$, $Y_2O_3$, $Pb(Zr,Ti)O_3$ (PZT), $Pb_{1-x}La_xZr_{1-y}TiO_3$ (PLZT), $PB(Mg_{1/3}Nb_{2/3})O_3$—$PbTiO_3$ (PMN-PT), $BaTiO_3$, hafnia ($HfO_2$) and $SrTiO_3$.

5. The electrode tab of claim 1, wherein the aqueous binder is one or at least two selected from the group consisting of styrene-butadiene rubber, acrylated styrene-butadiene rubber, acrylonitrile-butadiene rubber, acrylonitrile-butadiene-styrene rubber, acrylic rubber, butyl rubber, fluoro rubber, polytetrafluoroethylene, polyethylene, polypropylene, ethylenepropylene copolymer, polyethylene oxide, polyvinylpyrrolidone, polyepichlorohydrin, polyphosphazenes, polyacrylonitrile, polystyrene, ethylene propylene diene copolymer, polyvinylpyrridine, chlorosulfonated polyethylene, latex, polyester resin, acrylic resin, phenolic resin, epoxy resin, polyvinyl alcohol, hydroxypropyl methylcellulose, hydroxypropyl cellulose and diacetyl cellulose.

6. The electrode tab of claim 1, wherein the slurry stabilizer is carboxymethyl cellulose, carboxyethyl cellulose, or derivatives thereof.

7. The electrode tab of claim 1, wherein the inorganic filler and the binder are contained at a weight ratio of 5:95 to 80:20.

8. The electrode tab of claim 1, wherein the slurry stabilizer is used in an amount of 0.1 wt % to 5 wt % with respect to the inorganic filler.

9. The electrode tab of claim 1, wherein the electrode tab is a positive electrode tab.

10. A secondary battery comprising the electrode tab as set forth in claim 1.

11. The secondary battery of claim 10, wherein the secondary battery is a lithium secondary battery.

12. The secondary battery of claim 10, wherein the secondary battery is a prismatic secondary battery or pouch-shaped secondary battery.

* * * * *